United States Patent Office 3,422,106
Patented Jan. 14, 1969

3,422,106
**AMINOETHERS DERIVED FROM 9,10-ETHANO-9,
10-DIHYDRO-9-ANTHROL AND THEIR SALTS
AND PROCESS FOR PREPARATION THEREOF**
Jacques Robert Boissier, Paris, and Roger Ratouis, Saint
Cloud, France, assignors to Societe anonyme dite: Societe Industrielle Pour la Fabrication des Antibiotiques
(S.I.F.A.) Paris, France, a French company
No Drawing. Filed Apr. 28, 1966, Ser. No. 545,836
Claims priority, application France, May 19, 1965, 17,620;
July 13, 1965, 24,526; Feb. 18, 1966, 50,219
U.S. Cl. 260—253        11 Claims
Int. Cl. A61k 27/00

ABSTRACT OF THE DISCLOSURE

Amino ethers of the formula:

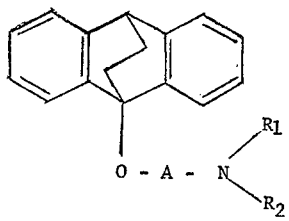

(1)

wherein A=an alkylene group having from 2 to 6 carbon atoms, and $R_1$ and $R_2$=H, lower alkyl, hydroxyalkyl or forming with N a heterocyclic radial such as piperidyl, piperazinyl, pyrrolidinyl, morpholinyl, said heterocyclic radical being eventually substituted by an alkyl or hydroxyalkyl, and pharmaceutically acceptable acid addition and quaternary ammonium salts thereof.

These compounds are useful as drugs, especially as antihistaminics, antianaphylactics, local anesthetics, diuretics, antiemetics and antitussives.

---

The present invention relates to new aminoethers derived from 9,10-ethano-9,10-dihydro-9-anthrol, their acid addition and quaternary ammonium salts, and process for preparation thereof.

The products according to the invention have proved to be very useful for human therapeutic purposes, namely as antihistaminics, antianaphylatics, local anesthetics, diuretics, antiemetics (particularly against motion sickness) and as antitussives.

The new aminoethers, derived from 9,10-ethano-9,10-dihydro-9-anthrol, according to the invention are compounds of the general formula:

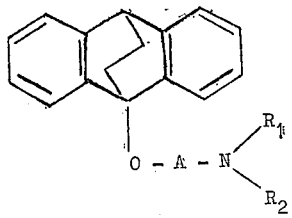

(1)

in which A represents a straight or branched alkylene radical containing from 2 to 6 carbon atoms and $R_1$ and $R_2$ which can be identical or different, represent hydrogen atoms or lower alkyl radicals or hydroxy lower alkyl radicals, or form with the nitrogen atom N a heterocyclic radical such as piperidyl, piperazinyl, pyrrolidinyl, morpholinyl, the said heterocyclic radical being eventually substituted by one or several lower alkyl or hydroxyalkyl radicals. Lower alkyl radicals or hydroxy lower alkyl radicals mean radicals containing from 1 to 4 carbon atoms.

According to the invention, the compounds of general Formula 1 can be prepared by reacting a compound of general formula:

(2)

in which X represents a halogen atom or a benzenesulfonyl, toluene-sulfonyl or methane-sulfonyl radical and A, $R_1$ and $R_2$ have the meanings above defined, with 9,10-ethano-9,10-dihydro-9-anthrol and an alkaline agent, and, at the completion of the reaction, isolating the compound of Formula 1 thus obtained.

The process may advantageously be carried out by reacting, in the presence of the alkaline agent, the 9,10-ethano-9,10-dihydro-9-anthrol with a great excess of the compound of Formula 2

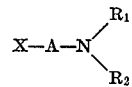

in comparison with the quantity stoichiometrically needful (e.g. twice this quantity). If a compound of Formula 2 wherein X is a halogen is employed, it is preferable to use, instead of the said compound, its salt formed from a hydracid; it is necessary, in that case, to increase the quantity of alkaline agent brought to the reaction medium.

In practice, the compound of Formula 2 is added preferably in two times, into a mixture of alkaline agent and 9,10-ethano-9,10-dihydro-9-anthrol in an anhydrous solvent such as benzene or toluene. The alkaline agent which may be, for instance, anhydrous sodium or potassium hydroxide, is used in a great excess, and the reaction is carried out with stirring and at the boiling temperature of the reaction medium.

When the reaction is over, the mineral derivatives are separated by filtration, and the compound of general Formula 1 is isolated by rectification of the filtrate or by another usual mean.

The process, according to the invention, may likewise be carried out by using as alkaline agent a metal hydride (sodium preferably); in this case, the metallic salt of 9,10-ethano-9,10-dihydro-9-anthrol is first prepared, by reacting this alcohol with an equimolecular amount of metal hydride. This reaction is performed in an anhydrous hydrocarbon such as, for instance, benzene, toluene, xylene, and operating advantageously under an inert dry gas such as nitrogen, and at the boiling temperature of the reaction medium. Then, the metallic derivative so obtained (its isolation is not necessary) is reacted with a compound of Formula 2 added to the reaction medium, while stirring, the temperature being the boiling temperature of the mixture.

When the reaction is over, the mineral compounds formed are separated by filtration and the compound of general Formula 1 so obtained is isolated by rectification of the filtrate or by another usual means.

It has been observed that the preparation of aminoethers of Formula 1 wherein $R_1$ represents hydrogen and $R_2$ represents a methyl radical may be also performed by a partial demethylation of the corresponding aminoether of Formula 1 wherein $R_1$ and $R_2$ represent each a methyl radical. It is given an example of such a preparation.

TABLE I

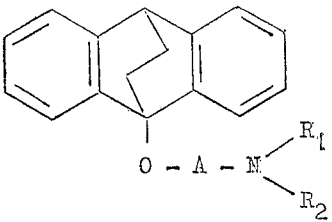

| −A− | −N(R1)(R2) | Y | L.D.50 i.p. mice mg./kg. | I.C.50 guinea pig isolated ileum | Antihistaminic activity in vivo | Local anesthetic activity |
|---|---|---|---|---|---|---|
| −CH₂−CH₂− | −NH−CH₃ | ClH | 134 | $2.10^{-8}$ | 800–1,000 | 196 |
| −CH₂−CH₂− | −N(CH₃)₂ | ClH | 140 | $5.10^{-9}$ | 1,000 | 96 |
| −CH₂−CH₂− | −N(CH₃)₂ | I CH₃ | 50 | $2.10^{-8}$ | 400–800 | --- |
| −CH₂−CH₂− | −N(CH₃)₂ | I CH₂CH₂OH | 84 | $10^{-8}$ | 400 | --- |
| −CH₂−CH₂− | −N(CH₃)₂ | 8-chloro theophylline | 164 | $5.10^{-9}$ | 1,000 | --- |
| −CH₂−CH₂− | −N(CH₃)₂ | 7-acetic theophylline | 293 | $10^{-8}$ | 1,000 | --- |
| −CH₂−CH₂− | −N(pyrrolidinyl) | ClH | 127 | $5.10^{-9}$ | 1,200–1,400 | 927 |
| −CH₂−CH₂− | −N(pyrrolidinyl) | ½H₂SO₄ | 75 | $5.10^{-9}$ | 1,000 | 1,041 |
| −CH₂−CH₂− | −N(pyrrolidinyl) | CH₃SO₃H | 135 | $10^{-8}$ | 1,000 | 1,074 |
| −CH₂−CH₂− | −N(C₂H₅)₂ | ClH | 150 | $10^{-6}$ | <200 | 479 |
| −CH₂−CH₂− | −N(piperidinyl) | ClH | 150 | $\leq 5.10^{-9}$ | 400–800 | 1,287 |
| −CH₂−CH₂− | −N(piperidinyl) | CH₃ I | 150 | $5.10^{-9}$ | 200 | 46 |
| −CH₂−CH₂− | −N(morpholinyl) | ClH | 120 | $10^{-7}$ | 1,000 | 85 |
| −CH₂−CH₂− | −N(N'-methyl piperazinyl) | ClH | 174 | $10^{-7}$ | 1,000–1,200 | 201 |
| −CH₂−CH(CH₃)− | −N(CH₃)₂ | ClH | 123 | $5.10^{-8}$ | 800–1,000 | 517 |
| −(CH₂)₃− | −N(CH₃)₂ | Base | 133 | $10^{-7}$ | <200 | 322 |
| −(CH₂)₃− | −N(N'-methyl piperazinyl) | ClH | 143 | $10^{-6}$ | <200 | 476 |
| −CH₂−CH(CH₃)−CH₂− | −N(N'-methyl piperazinyl) | ClH | 149 | $10^{-6}$ | <200 | 742 |

Table I shows:

(a) the especially remarkable antihistaminic activity of the 9-(2 - dimethylamino ethoxy)-9,10-ethano-9,10-dihydro anthracene hydrochloride and 8-chloro theophellinate, as also of the 9-[2-(1-pyrrolidinyl)ethoxy]-9,10-ethano-9,10-dihydro anthracene hydrochloride and acid sulfate.

(b) the quite remarkable local anesthetic activity of the 9-(2-piperidino ethoxy)-9,10-ethano-9,10 - dihydro anthracene hydrochloride as well as of the 9-[2-(1-pyrrolidinyl) ethoxy]-9,10-ethano-9,10-dihydro anthracene acid sulfate and methane sulfonate.

The aminoethers of general Formula 1 have a basic character and, according to the invention, their acid addition salts can be prepared by treating said aminoethers with the corresponding organic or inorganic acids, preferably in the presence of a solvent. Among these solvents, preferentially are used anhydrous solvents such as benzene, ethyl ether, ethanol and acetone.

According to the invention, the quaternary ammonium salts can be prepared by treating the aminoethers of general Formula 1 with the corresponding alkylating agents, in the presence of a solvent. Among these solvents, preference is given to anhydrous solvents such as ethyl ether, acetonitrile, acetone, dioxane, methanol and ethanol. The salts can eventually be prepared without isolating the aminoether of general Formula 1 from the reaction medium where it was obtained.

Toxicological and pharmacological investigation of the novel compounds according to the invention show their great activity and outstanding interest.

The results obtained in toxicological studies (lethal dose 50), antihistaminic activity and local anesthetic activity have been summarized in Table I where were represented:

(a) Lethal doses 50 determined in mice by intraperitoneal route.
(b) average concentrations required to produce a 50% inhibition on guinea-pig isolated ileum, according to Magnus' technique, and expressing the antagonistic action of the compounds against the contracturing action of histamine, (I.C. 50).
(c) the numbers of unitary lethal doses of histamine antagonized in guinea-pig by subcutaneous administration of 20 mg./kg. of the tested compound; the unitary lethal dose of histamine used in the experimentation was 0.8% mg./kg. of histamine dihydrochloride administered by intravenous route, 30 minutes after the tested compound. The number of unitary lethal doses of histamine antagonized by a compound showed the considerable antihistaminic activity in vivo.
(d) the sum of the numbers of stimulations showing the local anesthetic activity upon rabbit cornea according to Regnier's technique (C. R. de l'Acad. Sc. Paris 1923—177—558). A 1% solution of each tested compound was used. The said numbers were the numbers of stimulations necessary to induce the oculo-palpebral reflex, 3 minutes, 6 minutes, 10 minutes, then every 5 minutes, after the instillation, the total experiment lasting one hour.

Pharmacological studies had, likewise, shown the great interest of the products, according to the invention, in the diuretic activity field. So, it has been observed, for instance, that 9-(2-dimethylamino ethoxy)-9,10-ethano-9,10-dihydro anthracene hydrochloride, 8 - chloro - theophyllinate, and 7-theophylline acetate administered to rats at the respective equimolecular doses of 65 mg./kg., of 100 mg./kg. and of 105 mg./kg. produced in these animals diuresis respectively 6.5 times, 15 times and 6 times equal to that obtained in control animals.

By another way, it was observed that, the products, according to the invention, and more peculiarly the salts obtained from xanthine derivatives containing an acid hydrogen were endowed with useful properties against vomiting and motion sickness.

It was, moreover, established that products according to the invention had very interesting antianaphylactic properties. More particularly was studied the activity, in that field of the 9-(2-dimethylamino ethoxy)-9,10-ethano-9,10-dihydro anthracene hydrochloride and of the 9-[2-(1-pyrrolidinyl)ethoxy]-9,10-ethano - 9,10 - dihydro anthracene sulfate, according to H. Giertz et al's technique (Int. Arch. Allergy 1961, 19, 178–191). The tests were conducted, first by sensitizing several guinea-pigs by an intraperitoneal injection of ovalbumin solution, then injecting, after 3 weeks, the tested products, at different doses by subcutaneous route, and lastly injecting again an ovalbumin solution 30 minutes after the tested products. It was observed that a dose of 2 mg./kg. of the tested products was sufficient to protect 100% of the experimented animals. Under the same conditions a dose of 5 mg./kg. of promethazine was necessary to obtain the same result.

Moreover, during a detailed study of 9-(2-dimethylamino ethoxy)-9,10 - ethano-9,10-dihydro anthracene hydrochloride, the following complementary data were obtained:

| | Mg./kg. |
|---|---|
| L.D. 50 by intravenous route in mice | 38 |
| L.D. 50 by gastric route in mice | 540 |

Minimal dose of compound protecting the animals against an unitary lethal dose of histamine injected by intravenous route, 30 minutes and 90 minutes after the administration of the product. The results are set out in Table II hereafter.

TABLE II

| Subcutaneous route | | Oral route | |
|---|---|---|---|
| Dose of product administered in mg./kg. | Percent of animals protected (after 30 minutes) | Dose of product administered in mg./kg. | Percent of animals protected (after 90 minutes) |
| 0.050 | 100 | 0.100 | 100 |
| 0.025 | 87.5 | 0.050 | 100 |
| 0.0125 | 62.5 | 0.025 | 37 |
| 0.00625 | 12.5 | | |

Protection of the guinea pig against the histaminic bronchospasm according to Halpern's technique (Arch. Inter. Pharmacodyn. 1942, 68, 339–408) which consisted in submitting guinea pig to a histamine aerosol; the results are set out in Table III hereafter.

TABLE III

| Dose of product administered in mg./kg. | Subcutaneous route percent of protected animals after— | | Oral route percent of protected animals |
|---|---|---|---|
| | ½ h | 3 h | |
| 0.200 | 100 | 100 | 100 |
| 0.100 | 85 | 100 | 100 |
| 0.050 | 45 | 100 | 50 |
| 0.025 | 0 | 93 | 0 |

It was observed that the product potentialized moderately, barbituric hypnosis in mice.

Because of their interesting pharmacological properties, the aminoethers of general Formula 1, their acid addition and quaternary ammonium salts are very useful medicines for human therapeutics, namely as antihistaminics, antianaphylactics, local anesthetics, diuretics, antiemetics (against motion sickness, nausea and vomiting) and as antitussives. They can, thereby, be employed in local or general treatment of allergy diseases, as local anesthetics in medicine, surgery and dentistry, in treatment of oedema, of nauseous states, of motion sickness and cough.

The usual dose may vary, according to the product used, the patient treated, the complaint concerned, and the administration route selected; it may be for example, by oral route, in human being from 2 mg. to 250 mg. per day; when these products are employed by parenteral route, parenteral solutions more or less concentrated, according to the solubility of the novel compound, are used; the preferential concentrations are between 0.5% and 10%; in the pharmaceutical compositions, for local application, as for example ointments, the rate of active principles is advantageously comprised between 0.5% and 5%. These data, of course, are not limiting.

As medicines, the aminoethers of general Formula 1 can be employed either in the form of the base or in the form of acid addition salts or quaternary ammonium salts, pharmaceutically acceptable. Preference is given, among the acid addition salts to those obtained with the following acids: hydrochloric, hydrobromic, hydriodic, nitric, sulfuric, phosphoric, acetic, maleic, fumaric, succinic, tartaric, citric, benzoic, alkanesulfonics, as also to those obtained with xanthine derivatives containing an acid hydrogen, and among the quaternary ammonium salts to those obtained with alkyl halides such as, for example, methyl chloride, methyl bromide, methyl iodide, hydroxyalkyl halides such as, for instance, 2-hydroxyethyl chloride, bromide or iodide, alkyl sulfates such as for instance, dimethyl sulfate, alkyl alkanesulfonates or alkyl arenesulfonates such as methyl methane-sulfonate, methyl benzene sulfonate, or methyl toluenesulfonate.

The present invention is also concerned with pharmaceutical compositions which comprise as active principles one at least of the compounds of the general Formula 1 and/or their acid addition salts and/or their quaternary ammonium salts. These compositions are prepared so that they can be administered through digestive, parenteral or local route.

They can be solid or liquid; the pharmaceutical compositions are those usually employed in human medicine, as for example tablets, coated or not, capsules, solutions, syrups, suppositories, parenteral preparations, ointments, creams, aerosols; they are prepared according to usual means. The active principle or principles thereof are incorporated with usual excipients which are normally employed in those pharmaceutical compositions, such as, for example, talcum, gum arabic, lactose, starch, magnesium stearate, cocoa butter, aqueous or nonaqueous vehicles, animal or vegetable fatty substances, paraffin derivatives, glycols, various wetting, dispersing and emulsifying agents and preservatives.

The following nonlimiting examples illustrate the invention:

EXAMPLE 1

(A) Preparation of the base

A mixture of 22.2 g. (0.1 mole) of 9,10-ethano-9,10-dihydro-9-anthrol, 14.4 g. (0.1 mole) of 2-dimethylamino chlorethane hydrochloride, 16 g. of finely powdered dry sodium hydroxide in 250 ml. of anhydrous benzene was boiled under reflux with stirring for 8 hours. After this time, 14.4 g. (0.1 mole) of 2-dimethylamino chlorethane hydrochloride were added and the mixture was boiled again under reflux with stirring for 16 hours.

After cooling, the mixture was filtered in vacuo. The filtrate was concentrated in vacuo in order to drive off the benzene and the residue was distilled to give 22 g. (75%) of 9-(2-dimethylamino ethoxy)-9,10-ethano-9,10-dihydro anthracene (oil boiling at 158°–160° C./0.1 mm. Hg.). This oil which crystallizes on standing, was recrystallized from petroleum ether, yielding white crystals. Melting point: 60° C. on a heating stage microscope.

Ultraviolet spectrum: $\lambda$ maximum 258 m$\mu$ (shoulder), 264 m$\mu$ (log $\epsilon$:3.06), 271 m$\mu$ (log $\epsilon$:3.16).

Analysis $C_{20}H_{23}NO$.—Calculated: C, 81.9%; H, 7.9%. Found: C, 82.0%; H, 8.0%.

(B) Preparation of the hydrochloride

1. Starting from the pure base.—A solution of 0.05 mole of dry hydrochloric acid in absolute ethanol was added to a solution of 14.65 g. (0.05 mole) of the above base in 100 ml. of anhydrous benzene. After cooling, the formed crystals were filtered off. Recrystallization from isopropanol yielded 13 g. of 9-(2-dimethylamino ethoxy)-9,10-ethano-9,10-dihydro anthracene hydrochloride as white crystals. Melting point: 231°–232° C. (in capillary tube).

Analysis $C_{20}H_{24}ClNO$.—Calculated: C, 72.8%; H, 7.3%. Found: C, 72.8%; H, 7.5%.

2. Starting from the benzene solution.—Working as described in paragraph (A) and after filtering the benzene solution as indicated in (A) the filtrate was shaken with 250 ml. of N hydrochloric acid. A precipitate was observed; it was filtered off, washed with a little amount of water and benzene, dried and recrystallized from 50 ml. of isopropanol, to give 20.8 g. (63%) of 9-(2-dimethylamino ethoxy)-9,10-ethano-9,10-dihydro anthracene hydrochloride, identical with the compound described in paragraph (B) 1°.

EXAMPLE 2

Following the process described in Example 1(A) but using twice 17.2 g. (twice 0.1 mole) of 2-diethylamino chlorethane hydrochloride, was obtained after concentration in vacuo, the crude 9-(2-diethylamino ethoxy)-9,10-ethano-9,10-dihydro anthracene (light tan oil).

In order to prepare directly the hydrochloride, the above base was dissolved in 150 ml. of anhydrous ether and 0.15 mole of dry hydrochloric acid in solution in absolute ethanol was added. After cooling the formed crystals were filtered off; recrystallisation from a mixture of acetone and isopropanol, yielded 10 g. of 9-(2-diethylamino ethoxy)-9,10-ethano-9,10-dihydro anthracene hydrochloride as white crystals, melting at 174°–176° C. on a heating stage microscope.

Analysis $C_{22}H_{28}ClNO$.—Calculated: C, 73.8%; H, 7.9%. Found: C, 73.9%; H, 7.8%.

EXAMPLE 3

(A) Preparation of the base

Following the procedure described in paragraph (A) of Example 1 but using twice 18.4 g. (twice 0.1 mole) of 2-piperidino chlorethane hydrochloride, after evaporating in vacuo, a solid residue was obtained and recrystallized from heptane yielding (60%) 20 g. of 9-(2-piperidino ethoxy)-9,10-ethano-9,10-dihydro anthracene as a white crystalline compound. Melting point: 101° C. on a heating stage microscope.

Analysis $C_{23}H_{27}NO$.—Calculated: C, 82.8%; H, 8.2%. Found: C, 82.9%; H, 8.2%.

(B) Preparation of the hydrochloride

Following the process described in paragraph B, 1° of Example 1, but using 16.65 g. (0.05 mole) of the above base, recrystallization from isopropanol afforded 11 g. of white crystalline 9-(2-piperidino ethoxy) ethano-9,10-dihydro-9,10 anthracene hydrochloride. Melting point: 225° C. on a heating stage microscope.

Analysis $C_{23}H_{28}ClNO$.—Calculated: C, 74.7%; H, 7.6%. Found: C, 74.5%; H, 7.7%.

EXAMPLE 4

To a solution of 2.93 g. (0.01 mole) of 9-(2-dimethylamino ethoxy)-9,10-ethano-9,10-dihydro anthracene in 100 ml. of anhydrous ether, 4 g. of methyl iodide were added. A precipitate was swiftly formed and filtered off after standing for several hours at room temperature.

There were obtained 4 g. of white crystalline 9-(2-dimethylamino ethoxy)-9,10-ethano-9,10-dihydro anthracene methiodide. Melting point: 250° C. on a heating stage microscope.

Analysis $C_{21}H_{26}INO$.—Calculated: C, 57.9%; H, 6.0%. Found: C, 58.1%; H, 6.0%.

EXAMPLE 5

Following the procedure described in Example 4 but using 3.33 g. (0.01 mole) of 9-(2-piperidino ethoxy)-9,10-ethano-9.10-dihydro anthracene dissolved in a mixture of 70 ml. of anhydrous ether and 20 ml. of acetonitrile, recrystallization from a mixture of methanol and acetonitrile afforded 3 g. of 9-(2-piperidino ethoxy)-9,10-ethano-9,10-dihydro anthracene methiodide as white crystals. Melting point: 264°–265° C. on a heating stage microscope.

Analysis $C_{24}H_{30}INO$.—Calculated: C, 60.6%; H, 6.4%. Found: C, 60.7%; H, 6.3%.

EXAMPLE 6

(A) Preparation of the base

Following the procedure described in paragraph (A) of Example 1, but using twice 17 g. (twice 0.1 mole) of 2-pyrrolidino chlorethane hydrochloride, after concentration in vacuo, there was obtained the 9-[2-(1-pyrrolidinyl) ethoxy]-9,10-ethano-9,10-dihydro anthracene as a solid residue. Recrystallization from petroleum ether yielded 18.7 g. (59%) of white crystals. Melting point: 85°–86° C. on a heating stage microscope.

(B) Preparation of the acid sulphate

To the solution of 2.5 g. of sulphuric acid in 50 ml. of absolute ethanol was added a solution of 8 g. (0.025 mole) of the above base in absolute ethanol. The mixture was left standing at 0° C. for 15 hours, and the formed crystals were filtered off. Recrystallization from ethanol yielded 7 g. of 9-[2-(1-pyrrolidinyl)ethoxy]-9,10-ethano-9,10-dihydro anthracene acid sulphate as white crystals. Melting point: 228°–230° C. on a heating stage microscope.

Analysis $C_{22}H_{27}NO_5S$.—Calculated: C, 63.3%; H, 6.5%. Found: C, 63.3%; H, 6.8%.

EXAMPLE 7

Following the procedure described in paragraph (B) of Example 6, but using 7.3 g. (0.025 mole) of 9-(2-dimethylamino ethoxy)-9,10-ethano-9,10-dihydro anthracene dissolved in 80 ml. of anhydrous benzene, recrystallization from water yielded 6 g. of 9-(2-dimethylamino ethoxy)-9,10-ethano-9,10-dihydro anthracene acid sulphate as a white crystalline product. Melting point: 195° C. on a heating stage microscope.

Analysis $C_{20}H_{25}NO_5S$.—Calculated: C, 61.4%; H, 6.4%. Found: C, 61.4%; H, 6.5%.

Using nitric acid instead of sulphuric acid, there was obtained, in the same manner, the 9-(2-dimethylamino ethoxy) - 9,10 - ethano-9,10-dihydro anthracene nitrate which was recrystallised from ethanol. Melting point: 187°–188° C. on a heating stage microscope.

EXAMPLE 8

To a solution of 2.93 g. (0.01 mole) of 9-(2-dimethylamino ethoxy)-9,10-ethano-9,10-dihydro anthracene in 50 ml. of acetonitrile, was added 1.72 g. (0.01 mole) of 2-iodo ethanol. The mixture was boiled to reflux for 2 hours, and was allowed to stand for 15 hours at 0° C. The formed precipitate was filtered off. Recrystallization from methanol yielded 3.5 g. of 9-(2-dimethylamino ethoxy)-9,10-ethano-9,10-dihydro anthracene 2-hydroxy ethiodide as white crystals. Melting point: 209° C. on a heating stage microscope.

Analysis $C_{22}H_{28}INO_2$.—Calculated: C, 56.8%; H, 6.1%. Found: C, 56.8%; H, 5.9%.

EXAMPLE 9

Following the procedure described in paragraph (A) of Example 1, but using twice 15.8 g. (twice 0.1 mole) of 3-dimethylamino chloropropane hydrochloride, there were obtained, after concentration in vacuo the crude 9-(3-dimethylamino propoxy)-9,10-ethano-9,10-dihydro anthracene as a light yellow oil which partly crystallized.

The mixture was extracted with pentane, and filtered in vacuo. The solid residue eliminated, the pentane was concentrated and yielded 13 g. (42.5%) of 9-(3-dimethylamino propoxy)-9,10-ethano-9,10-dihydro anthracene as cream colored crystals. Melting point 44°–45° C. on a heating stage microscope.

Analysis $C_{21}H_{25}NO$.—Calculated: C, 82.0%; H, 8.2%. Found: C, 82.0%; H, 8.3%.

EXAMPLE 10

(A) Preparation of the base

Following the procedure described in paragraph (A) of Example 1, but using all at once, at the outset of the reaction 24.4 g. (0.15 mole) of 2-(4-methyl-1-piperazinyl) chlorethane and 6 g. (0.15 mole) of sodium hydroxide, there were obtained after concentration in vacuo the crude 9-[2-(4-methyl-1-piperazinyl) ethoxy]-9,10-ethano - 9,10 - dihydro anthracene as an oil partly crystallizing.

This mixture was extracted with pentane and filtered in vacuo. The solid residue eliminated, concentration of the pentane yielded 19.4 g. (43%) of cream colored crystals which were recrystallized from petroleum ether. Melting point: 107° C. on a heating stage microscope.

Analysis $C_{23}H_{28}N_2O$.—Calculated: C, 79.3%; H, 8.1%. Found: C, 79.1%; H, 8.4%.

(B) Preparation of the dihydrochloride

Following the procedure described in paragraph (B) 1° of Example 1, but using 8.7 g. (0.025 mole) of the above base, recrystallization from ethanol yielded 6 g. of 9-[2-(4 - methyl-1-piperazinyl)-ethoxy]-9,10-ethano-9,10-dihydro anthracene dihydrochloride as white crystals. Melting point 230°–235° C. on a heating stage microscope.

Analysis $C_{23}H_{30}Cl_2N_2O$.—Calculated: C, 65.6%; H, 7.2%. Found: C, 65.6%; H, 7.2.

EXAMPLE 11

Working under dry nitrogen, the mixture of 22.2 g. (0.1 mole) of 9,10-ethano-9,10-dihydro-9-anthrol and of 2.65 g. (0.11 mole) of sodium hydride employed as a 50% suspension in mineral oil, in 250 ml. of anhydrous toluene was boiled to reflux for 3 hours with stirring, then 20.4 g. (0.11 mole) of 3-(4-methyl-1-piperazinyl)-1-chloro-2-methyl propane were added and the mixture was boiled to reflux with stirring for 24 hours.

After cooling, the reaction medium was filtered in vacuo, and toluene driven off by concentration in vacuo. The obtained oil was dissolved in anhydrous ether, filtered and 100 ml. of 2 N hydrochloric acid solution in absolute ethanol were added. The formed crystals were collected to yield 21 g. (47%) of 9-[3-(4-methyl-1-piperazinyl)-2-methyl propoxy]-9,10-ethano-9,10-dihydro anthracene dihydrochloride as white crystals. The product recrystallized from a mixture methanol-water had a melting point of 190°–195° C. on a heating stage microscope.

Analysis $C_{25}H_{34}Cl_2N_2O$.—Calculated: C, 66.8%; H, 7.6%. Found: C, 66.7%; H, 7.7%.

EXAMPLE 12

Following the procedure described in Example 11, but using 19.4 g. (0.11 mole) of 3-(4-methyl-1-piperazinyl)-1-chloro propane, the solvent was driven off in vacuo, there was obtained the crude 9-[3-(4-methyl-1-piperazinyl) propoxy]-9,10-ethano-9,10-dihydro anthracene as cream colored crystals. These crystals were dissolved in 200 ml.

of benzene, filtered, and 100 ml. of a 2 N hydrochloric acid solution in absolute ethanol were added. Filtration afforded 20 g. (45%) of 9-[3-(4-methyl-1-piperazinyl) propoxy]-9,10-ethano-9,10-dihydro anthracene dihydrochloride as white crystals. Melting point after recrystallization from water: 233°–234° C. on a heating stage microscope.

*Analysis* $C_{24}H_{32}Cl_2N_2O$.—Calculated: C, 66.2%; H, 7.4%. Found: C, 66.0%; H, 7.6%.

EXAMPLE 13

Following the procedure described in Example 11, but using 16.45 g. (0.11 mole) of 2-morpholino chlorethane, the solvent was driven off by concentration in vacuo, the crude 9-(2-morpholino ethoxy)-9,10-ethano-9,10-dihydro anthracene was obtained as a solid product and dissolved in 200 ml. of anhydrous ether. After filtration, 50 ml. of 2 N hydrochloric acid solution in absolute ethanol were added, the formed crystals were filtered off and yielded 18.5 (50%) of 9-(2-morpholino ethoxy)-9,10-ethano-9,10-dihydro anthracene hydrochloride as white crystals. Melting point, after recrystallization from acetonitrile: 214°–217° C. on a heating stage microscope.

*Analysis* $C_{22}H_{26}NO_2Cl$.—Calculated: C, 71.1%; H, 7.1%. Found: C, 71.0%; H, 7.1%.

EXAMPLE 14

Following the procedure described in Example 11, but using 13.4 g. (0.11 mole) of 2-dimethylamino-1-chloro propane, the solvent was driven off by concentration in vacuo, the crude 9-(2-dimethylamino-2-methyl ethoxy)-9,10-ethano-9,10-dihydro anthracene was obtained as crystals and dissolved in 200 ml. of anhydrous ether. After filtration, 50 ml. of 2 N hydrochloric acid solution in absolute ethanol were added. The formed crystals were filtered off and yielded 12 g. (35%) of 9-(2-dimethylamino-2-methyl ethoxy)-9,10-ethano-9,10-dihydro anthracene hydrochloride as white crystals. Melting point after recrystallization from isopropanol: 192°–195° C. on a heating stage microscope.

*Analysis* $C_{21}H_{26}ClNO$.—Calculated: C, 73.3%; H, 7.6%. Found: C, 73.3%; H, 7.5%.

EXAMPLE 15

To a solution of 41 ml. of N hydrochloric acid solution in absolute ethanol was added a solution of 13 g. (0.041 mole) of 9-[2-(1-pyrrolidinyl)ethoxy]-9,10-ethano-9,10-dihydro anthracene in absolute ethanol. The mixture was concentrated in vacuo and the solid residue recrystallized from water yielding 12 g. of 9-[2-(1-pyrrolidinyl)ethoxy]-9,10-ethano-9,10-dihydro anthracene hydrochloride as white crystals. Melting point: 205°–207° C. on a heating stage microscope.

*Analysis* $C_{22}H_{26}ClNO$.—Calculated: C, 74.2%; H, 7.4%. Found: C, 74.2%; H, 7.5%.

EXAMPLE 16

Following the procedure described in Example 15, but using a Normal hydrobromic acid solution in absolute ethanol; the crystallization of the solid residue from isopropanol yielded 11 g. of 9-[2-(1-pyrrolidinyl)ethoxy]-9,10-ethano-9,10-dihydro anthracene hydrobromide as white crystals. Melting point: 221°–222° C. on a heating stage microscope.

*Analysis* $C_{22}H_{26}BrNO$.—Calculated: C, 66.0%; H, 6.6%. Found: C, 66.1%; H, 6.6%.

EXAMPLE 17

To a solution of 4.6 g. (0.05 mole) of methane sulfonic acid in 30 ml. of acetonitrile, was added a solution of 16 g. (0.05 mole) of 9-[2-(1-pyrrolidinyl) ethoxy]-9,10-ethano-9,10-dihydro anthracene in 150 ml. of ether. The formed crystals were filtered off and afforded 19.7 g. (96%) of 9-[2-(1-pyrrolidinyl) ethoxy]-9,10-ethano-9,10-dihydro anthracene methane sulfonate as very soluble (in water) white crystals. Melting point: after recrystallization from acetonitrile ether: 168°–172° C. on a heating stage microscope.

*Analysis* $C_{23}H_{29}NO_4S$.—Calculated: C, 66.5%; H, 7.0%. Found. C, 66.7%; H, 6.9%.

EXAMPLE 18

To a solution of 4.6 g. (0.05 mole) of methane sulfonic acid in 30 ml. of acetonitrile was added a solution of 14.65 g. (0.05 mole) of 9-(2-dimethylamino ethoxy)-9,10-ethano-9,10-dihydro anthracene in 100 ml. ether. The formed crystals were filtered off, yielding 12 g. (90%) of 9-(2-dimethylamino ethoxy)-9,10-ethano-9,10-dihydro anthracene methane sulfonate as water soluble white crystals. Melting point, after recrystallization from acetone: 147°–148° C., on a heating stage microscope.

*Analysis* $C_{21}H_{27}NO_4S$.—Calculated: C, 64.8%; H, 7.0%. Found: C, 64.3%; H, 7.2%.

EXAMPLE 19

The mixture of 29.3 g. (0.1 mole) of 9-(2-dimethylamino ethoxy)-9,10-ethano-9,10-dihydro anthracene and of 21.4 g. (0.1 mole) of 8-chloro theophylline in 400 ml. of ethanol was boiled until complete dissolution, and allowed to stand for 12 hours in a refrigerator. The formed crystals filtered off yielded 40 g. (78%) of 9-(2-dimethylamino ethoxy) - 9,10-ethano-9,10-dihydro anthracene-8-chloro theophyllinate as white crystals. Melting point: 178°–179° C. on a heating stage microscope.

*Analysis* $C_{27}H_{30}ClN_5O_3$.—Calculated: C, 63.8%; H, 6.0%. Found: C, 63.8%; H, 6.4%.

EXAMPLE 20

To a solution of 14.65 g. (0.05 mole) of 9-(2-dimethylamino ethoxy)-9,10-ethano-9,10-dihydro anthracene in 20 ml. of acetonitrile was added a hot solution of 11.9 g. (0.05 mole) of 7-theophylline acetic acid in acetonitrile (100 ml.) and water (20 ml.). The solvents were driven off by concentration in vacuo, and the residue taken up twice by 50 ml. of acetone, filtered off to yield 21 g. (76%) of 9-(2-dimethylamino ethoxy)-9,10-ethano-9,10-dihydro anthracene 7-theophylline acetate recrystallizable from absolute ethanol. Melting point: 172°–175° C. on a heating stage microscope.

*Analysis* $C_{29}H_{33}N_5O_5$.—Calculated: C, 65.5%; H, 6.3%. Found: C, 65.5%; H, 6.4%.

EXAMPLE 21

(A) Preparation of the base

The solution of 10.85 g. (0.1 mole) of ethyl chloroformate in 50 ml. of benzene was added drop by drop to a solution of 14.65 g. (0.05 mole) of 9-(2-dimethylamino ethoxy)-9,10-ethano-9,10-dihydro anthracene in 50 ml. of benzene. Then, the mixture was boiled to reflux for 6 hours. After cooling, the benzenic solution was washed with dilute hydrochloric acid, with water and concentrated in vacuo. There were obtained 12.5 g. of crude-9-(N-carbethoxy N-2-methylamino ethoxy)-9,10-ethano-9,10-dihydro anthracene as an oil, which was dissolved into a solution of 11 g. of potassium hydroxide in 100 ml. of diethylene glycol. The mixture was brought to reflux for 8 hours, allowed to cool, and after addition of 200 ml. of water, extracted with ether. Concentration in vacuo yielded 8.75 g. (63%) of 9-(2-methylamino ethoxy)-9,10-ethano-9,10-dihydro anthracene recrystallizable from pentane. Melting point: 92°–94° C. on a heating stage microscope.

*Analysis* $C_{19}H_{21}NO$.—Calculated: C, 81.7%; H, 7.6%. Found: C, 81.6%; H, 7.5%.

(B) Preparation of the hydrochloride

To the solution of 6 g. of the above crude base in 25 ml. of anhydrous ether, was added the equimolecular quantity of ethanolic hydrochloric acid. After standing for 15 hours, the formed precipitate was collected to give 4.5 g. of 9 - (2-methylamino ethoxy)-9,10-ethano-9,10-dihydro anthracene hydrochloride as white crystals. Melting point: 260°–263° C. on a heating stage microscope, after recrystallization from ethanol.

Analysis $C_{19}H_{22}ClNO$.—Calculated: C, 72.3%; H, 7.0%. Found: C, 72.2%; H, 6.9%.

EXAMPLE 22

Tablets were prepared which correspond to the formula:

9 - (2 - dimethylamino ethoxy) - 9,10-ethano-9,10-dihydro anthracene hydrochloride _____mg\_\_ 25
Excipient s.q. _____tablets\_\_ 1

(Excipient can be: lactose, starch, talcum, magnesium stearate.)

In the same manner were prepared:

Tablets with a dose of 25 mg. of 9-(2-dimethylamino ethoxy)-9,10-ethano-9,10-dihydro anthracene 8-chloro theophyllinate.
Tablets with a dose of 25 mg. of 9-(2-dimethylamino ethoxy) - 9,10 - ethano-9,10-dihydro anthracene 7-theophylline acetate.
Tablets with a dose of 10 mg. of 9-[2-(1-pyrrolidinyl) ethoxy] - 9,10-ethano-9,10-dihydro anthracene hydrochloride.
Tablets with a dose of 10 mg. of 9-[2-(1-pyrrolidinyl) ethoxy]-9,10-ethano-9,10-dihydro anthracene acid sulfate.

EXAMPLE 23

A syrup was prepared which corresponds to the formula:

9 - (2 - dimethylamino ethoxy)-9,10-ethano-9,10-dihydro anthracene hydrochloride _____mg\_\_ 100
Sweetened and flavoured excipient s.q. _____ml\_\_ 100

EXAMPLE 24

Parenteral preparations were prepared which correspond to the formula:

9-(2-dimethylamino ethoxy)-9,10-ethano-9,10-dihydro anthracene hydrochloride _____mg\_\_ 25
Aqueous solution s.q. _____ml\_\_ 2

EXAMPLE 25

A parenteral solution which corresponds to the formula:

9-[2-(1-pyrrolidinyl) ethoxy]-9,10-ethano-9,10-dihydro anthracene methane sulfonate _____g\_\_ 1
Aqueous solution s.q. _____ ml\_\_ 100

EXAMPLE 26

A parenteral solution which corresponds to the formula:

9-[2-(1-pyrrolidinyl) ethoxy]-9,10-ethano-9,10-dihydro anthracene methane sulfonate _____g\_\_ 5
Aqueous solution s.q. _____ml\_\_ 100

EXAMPLE 27

A dermic cream was prepared which corresponds to the formula:

9-(2-dimethylamino ethoxy)-9,10-ethano-9,10-dihydro anthracene hydrochloride _____g\_\_ 2
Emulsified excipient s.q. _____g\_\_ 100

EXAMPLE 28

An ointment was prepared which corresponds to the formula:

9-[2-(1-pyrrolidinyl) ethoxy]-9,10-ethano-9,10-dihydro anthracene acid sulfate _____g\_\_ 1
Excipient s.q. _____g\_\_ 100

We claim:
1. A compound selected from the group consisting of new amino-ethers derived from 9,10-ethano-9,10-dihydro-9-anthrol, having the general formula:

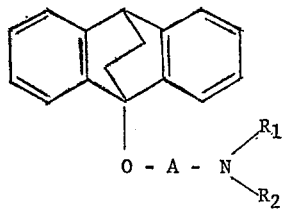

(1)

in which A represents an alkylene radical containing from 2 to 6 carbon atoms, and $R_1$ and $R_2$ are members selected from the group consisting of hydrogen, lower alkyl, hyroxy lower alkyl and when taken together with the nitrogen to which they are attached, piperidyl, piperazinyl, pyrrolidinyl, morpholinyl, lower alkyl piperidyl, lower alkyl piperazinyl, lower alkyl pyrrolidinyl, lower alkyl morpholinyl, lower hydroxy alkyl piperidyl, lower hydroxy alkyl piperazinyl, lower hydroxy alkyl pyrrolidinyl and lower hydroxy alkyl morpholinyl, and pharmaceutically acceptable acid addition and quaternary ammonium salts thereof.

2. The compound having the general formula of claim 1 wherein A is an ethylene radical and $R_1$ and $R_2$ are methyl radicals.

3. The hydrochloride of the compound having the general formula of claim 1 wherein A is an ethylene radical and $R_1$ and $R_2$ are methyl radicals.

4. The 8-chlorotheophyllinate of the compound having the general formula of claim 1 wherein A is an ethylene radical and $R_1$ and $R_2$ are methyl radicals.

5. The 7-theophylline acetate of the compound having the general formula of claim 1 wherein A is an ethylene radical and $R_1$ and $R_2$ are methyl radicals.

6. The compound having the general formula of claim 1 wherein A is an ethylene radical and

represents an -1-pyrrolidinyl radical.

7. The hydrochloride of the compound having the general formula of claim 1 wherein A is an ethylene radical and

represents an -1-pyrrolidinyl radical.

8. The acid sulfate of the compound having the general formula of claim 1 wherein A is an ethylene radical and

represents an -1-pyrrolidinyl radical.

9. The methane sulfonate of the compound having the general formula of claim 1 wherein A is an ethylene radical and

represents an -1-pyrrolidinyl radical.

10. The compound having the general formula of claim 1 wherein A is an ethylene radical and

represents a piperidino radical.

11. The hydrochloride of the compound having the general formula of claim 1 wherein A is an ethylene radical and
represents a piperidino radical.
References Cited
UNITED STATES PATENTS
3,227,716  1/1966  Harms _____ 260—570.7
NICHOLAS S. RIZZO, *Primary Examiner.*
A. M. TIGHE, *Assistant Examiner.*
U.S. Cl. X.R.
260—570.7, 294.7, 294, 268, 326.5, 293.4, 247.5, 247.1, 247.2, 326.3; 424—250, 253, 267, 274, 330